(No Model.)
H. J. CHAMBERLAIN.
LOOSE PULLEY LUBRICATOR.
No. 503,902. Patented Aug. 22, 1893.
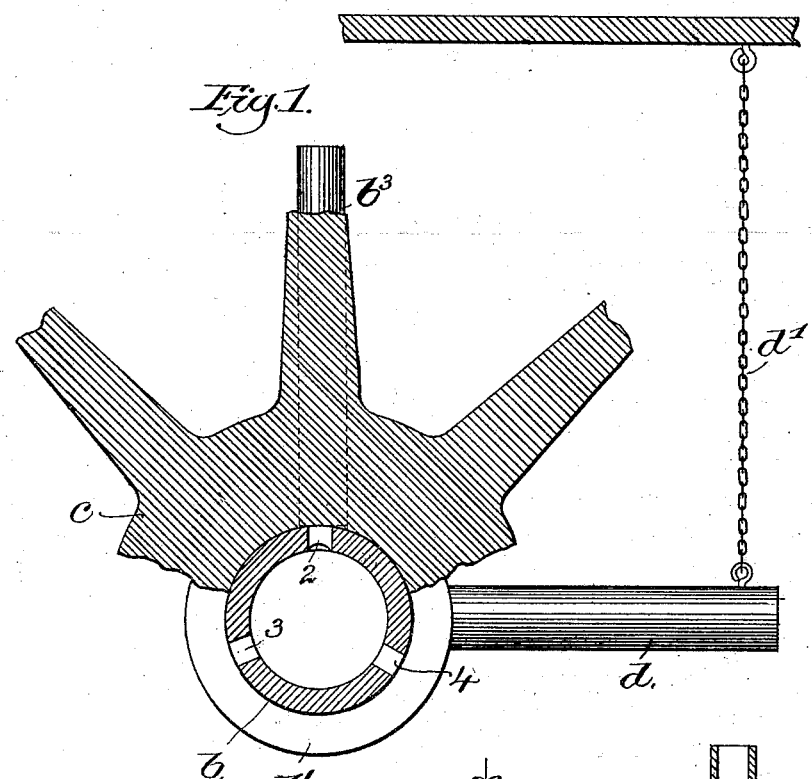
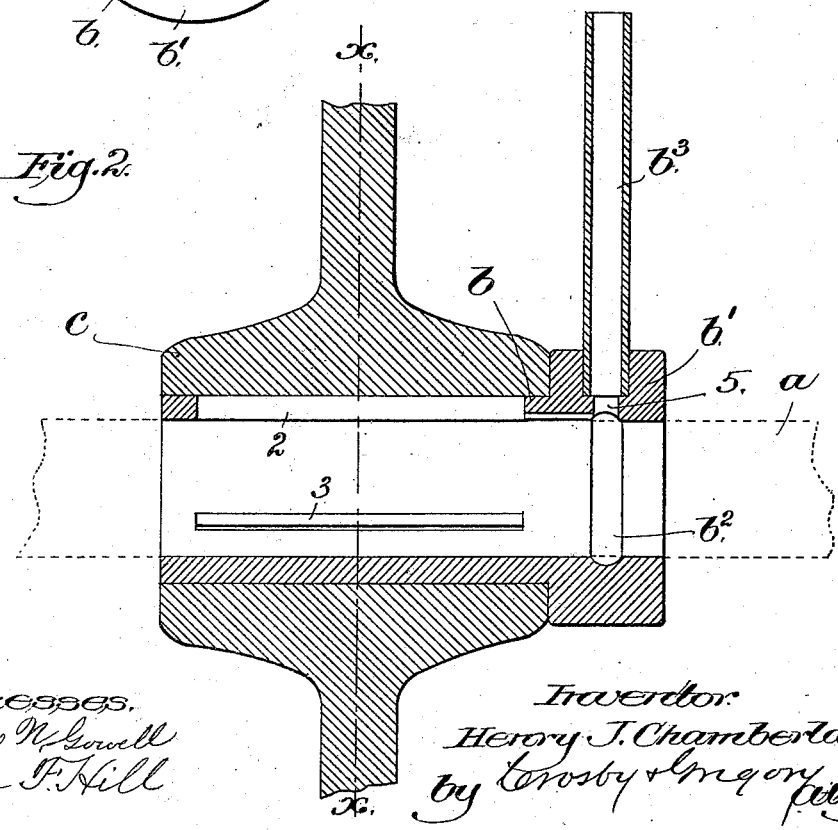
Witnesses.
Louis W. Gowell
Oscar F. Hill
Inventor:
Henry J. Chamberlain
by Crosby & Gregory attys.

United States Patent Office.

HENRY J. CHAMBERLAIN, OF HYDE PARK, MASSACHUSETTS, ASSIGNOR TO JOHN T. ROBINSON & CO., OF SAME PLACE.

LOOSE-PULLEY LUBRICATOR.

SPECIFICATION forming part of Letters Patent No. 503,902, dated August 22, 1893.

Application filed August 4, 1891. Serial No. 401,700. (No model.)

*To all whom it may concern:*

Be it known that I, HENRY J. CHAMBERLAIN, of Hyde Park, county of Norfolk, State of Massachusetts, have invented an Improvement in Pulley Connections, of which the following description, in connection with the accompanying drawings, is a specification, like letters and numerals on the drawings representing like parts.

Loose pulleys have, prior to this invention, so far as I am aware been mounted directly upon the shaft, or have been secured to a sleeve which is mounted directly upon the shaft. In the first instance, when the pulley becomes dry, if not oiled in a short time it binds on the shaft and every now and then turns said shaft a few revolutions; and in the latter instance the sleeve acts in precisely the same way, so that while apparently harmless they are quite dangerous. The danger in such instances arises in many ways, as for instance, an operator may be fixing a machine when suddenly and without warning the drive-shaft makes a few revolutions and his hand is caught in the machinery.

This invention has for its object to overcome this objection, and it consists in mounting the pulley loosely upon a sleeve which is held stationary by suitable means, and said sleeve is loosely mounted on the shaft. The shaft turns freely within the sleeve, and the pulley turns freely on the sleeve, and if the pulley becomes dry and binds to the sleeve, the latter, being held stationary, will not operate to turn the shaft, and also if the sleeve becomes dry it cannot operate to turn the shaft until it breaks the fastenings employed to hold it.

Figure 1 shows an end view of a loose pulley and sleeve embodying this invention, and Fig. 2, a vertical section of the pulley and sleeve, the shaft being represented by dotted lines.

The usual shaft $a$ see dotted lines Fig. 2, has mounted on it a sleeve $b$, consisting of a cylindrical shell, within which said shaft is free to revolve. The sleeve $b$ is made as long as the hub of the pulley $c$ which is mounted loosely on it. The sleeve $b$ has formed on, or it may be secured to it at one end outside the hub of the pulley $c$ a hub or flange $b'$, made larger in diameter than the sleeve, as shown. This hub is provided interiorly with an annular passage $b^2$, and the sleeve is provided with several slots, as 2, 3, 4; three being herein shown, one of said slots, as 2, communicating with the annular passage $b^2$. An oil-cup $b^3$, is secured to the hub $b'$, and the latter is provided with a passage 5 leading from said cup to the annular passage $b^2$. The oil contained in the cup flows down into the passage $b^2$ and around the shaft, entering the slot 2, and as the shaft revolves the oil is taken over the shaft, substantially filling the slots 3, 4. A pin $d$ is fixed to the hub $b'$, to which is attached a chain or cord $d'$, the opposite end of which chain or cord is designed to be attached to a fixed point. The chain or cord could be affixed to the hub or flange in any other suitable manner deemed expedient; or the pin $d$ might be held stationary by other means than a chain or cord. It will be seen that the shaft is free to turn within the sleeve; that the loose pulley is free to revolve on said sleeve; that the sleeve is held stationary; and that additional as well as more efficient means are provided for oiling the parts. By means of the oiling means shown, the shaft, as well as the sleeve on which the pulley turns, is thoroughly oiled.

I do not desire to confine my invention to its use in connection with loose pulleys, as it is obvious that it may be used in connection with wheels of various kinds and for various purposes, which turn loosely on a shaft or axle.

I claim—

1. A loose pulley connection, adapted to receive a shaft loosely within it, and comprising a stationary sleeve to receive loosely upon it a pulley, said sleeve having a series of slots, and a hub for said sleeve having an interior annular passage or recess, which communicates with one of said slots, and an oil passage through said hub, substantially as described.

2. A loose pulley connection, adapted to receive a shaft loosely within it, and comprising a stationary sleeve to receive loosely upon it a pulley, said sleeve having a slot therein, and a hub for said sleeve having an oil feed tube secured thereto, and an oil passage connecting said feed tube and slot, substantially as described.

In testimony whereof I have signed my name to this specification in the presence of two subscribing witnesses.

HENRY J. CHAMBERLAIN.

Witnesses:
LOUIS N. GOWELL,
AUGUSTA E. DEAN.